United States Patent
El-Batal et al.

(10) Patent No.: US 7,042,717 B2
(45) Date of Patent: May 9, 2006

(54) DATA STORAGE SYSTEM WITH A REMOVABLE BACKPLANE HAVING A ARRAY OF DISK DRIVES

(75) Inventors: Mohamad El-Batal, Westminster, CO (US); Bret Weber, Wichita, KS (US); Mark Nossokoff, Fort Collins, CO (US)

(73) Assignee: LSI Logic Corporation, Milpitas, CA (US)

(*) Notice: Subject to any disclaimer, the term of this patent is extended or adjusted under 35 U.S.C. 154(b) by 269 days.

(21) Appl. No.: 10/660,889

(22) Filed: Sep. 12, 2003

(65) Prior Publication Data

US 2005/0057898 A1 Mar. 17, 2005

(51) Int. Cl.
*G01F 1/16* (2006.01)

(52) U.S. Cl. .................. 361/685; 361/724; 361/727; 361/788

(58) Field of Classification Search .............. 361/679, 361/683, 685, 714–717, 719–727, 796, 797, 361/732; 439/157, 60, 152, 153; 360/97.01, 360/97.02; 312/223.2, 244, 331, 331.1, 334.23; 211/26, 184, 189; 710/100, 102
See application file for complete search history.

(56) References Cited

U.S. PATENT DOCUMENTS

| | | | |
|---|---|---|---|
| 5,506,750 A | | 4/1996 | Carteau et al. |
| 6,253,266 B1* | | 6/2001 | Ohanian ..................... 710/301 |
| 6,650,533 B1* | | 11/2003 | Curtis et al. ................ 361/685 |
| 6,819,560 B1* | | 11/2004 | Konshak et al. ............ 361/687 |
| 6,833,995 B1* | | 12/2004 | Hsue et al. ................. 361/727 |
| 2004/0105225 A1* | | 6/2004 | Malcolm et al. ............ 361/683 |

* cited by examiner

*Primary Examiner*—Michael Datskovskiy
(74) *Attorney, Agent, or Firm*—Cochran Freund & Young, LLC

(57) ABSTRACT

An array of disk drives may be mounted onto a backplane that may slide as a single unit into an enclosure, such as a rack mounted enclosure. The backplane may allow the disk drives to be arranged in multiple columns and rows such that the disk drives are generally parallel to each other. Such an arrangement affords excellent airflow around the disk drives and greatly simplifies servicing of the disk array.

26 Claims, 3 Drawing Sheets

DATA STORAGE SYSTEM WITH A REMOVABLE BACKPLANE HAVING A ARRAY OF DISK DRIVES

CROSS REFERENCE TO RELATED APPLICATIONS

This application is simultaneously filed with U.S. patent application Ser. No.10/660,88 entitled "Storage Recovery Using a Delta Log", by Mohamad El-Batal, et al and U.S. patent application Ser. No. 10/660,887 entitled "Disk Storage System with Removable Arrays of Disk Drives", by Mohamad El-Batal, et al, the entire contents of which are hereby specifically incorporated by reference for all they disclose and teach.

BACKGROUND OF THE INVENTION a. Field of the Invention

The present invention pertains to data storage systems and specifically to data storage systems having multiple disk drives operable in a single device.

b. Description of the Background

Multiple disk drives are an essential component in today's large data storage systems. Often, multiple individual disk drives may be configured in many different storage systems including various RAID configurations. Each disk drive may be a single point of failure that may be individually replaced in the field.

For rack mounted disk arrays, only the front or back of a rack mounted box is generally available for access to the individual disk arrays. In order for a disk array to have replaceable components, it is desirable for all of the serviceable components to be accessible through the front or rear ends of the rack mounted unit. Thus, it is typical for the removable components to slide into the unit from the front or back. Further, it is generally desirable to have airflow through the rack mounted unit from front to back or back to front, since the top and bottom of the unit can be assumed to be blocked.

For each removable component, the connections for the component are generally arranged perpendicular to the axis of insertion and removal. Since a typical removable component for a rack mounted disk array has a large number of connections, a connector with a large number of pins is often required. When many removable components exist in the unit, a large number of connectors are typically mounted on a midplane printed circuit board that is perpendicular to the removable components.

The midplane printed circuit board may have connectors on one side that face the removable components and connectors on the opposite side that connect to other interfaces. The midplane board poses several problems for a designer. First, the board can be a single point of failure for the entire rack mounted unit. Second the midplane board often poses substantial restrictions on airflow, since the midplane board is generally oriented perpendicular to the conventional airflow through a rack mounted box. Similar restrictions and shortcomings exist when the unit is configured as a desktop, benchtop, or other type of packaging.

In a rack mounted disk array with replaceable drives, only the front of the rack mounted case is generally used for the removal and replacement of the failed components. The depth of a rack mounted case may be 18 or more inches deep, yet a removable disk drive mounted on a carrier may be 6 inches deep, leaving a significant amount of room that cannot be used for removable disk drives. Often, such space is used for power supplies, controllers, and other such functional equipment.

It would therefore be advantageous to provide a system and method for mounting a plurality of disk drives in a replaceable, serviceable manner that eliminates the airflow restrictions of the conventional midplane printed circuit board. It would be further advantageous to provide a system and method provides for higher data storage per rack mounted unit than is possible with other disk array systems.

SUMMARY OF THE INVENTION

The present invention overcomes the disadvantages and limitations of previous solutions by providing a system and method for mounting an array of disk drives in a vertical manner on a backplane in an elongated rectangular prismatic enclosure that provides access through one of the smaller faces of the enclosure. The backplane may be oriented parallel to the direction of access and so as to not impede the flow of air through the enclosure. The backplane and the disk drives may be removable as a unit from the enclosure.

An embodiment of the present invention may therefore comprise a storage system with multiple disk drives comprising: a rectangular prismatic enclosure with six substantially planar sides having at least two largest sides and a primary access side and an input/output side, the primary access side not being one of the at least two largest sides and the input/output side being opposite of and substantially parallel to the primary access side; a back plane oriented substantially parallel to the at least one of the two largest sides, the back plane having a plurality of disk drive interface connectors and at least one interface connector; a plurality of disk drives having an elongated rectangular prismatic shape comprising two large faces and two small faces, one of the two large faces oriented perpendicularly to the backplane, each of the plurality of disk drives electrically connected to the disk drive interface connectors of the backplane; and the back plane with the plurality of disk drives slidingly engaged into the interface and adapted to be removed from the enclosure through the access side as a single unit.

Another embodiment of the present invention may comprise a method for constructing a storage system with multiple disk drives comprising: providing a rectangular prismatic enclosure with six substantially planar sides having at least two largest sides, a primary access side, and an input/output side, the primary access side not being one of the at least two largest sides and the input/output side being opposite of and substantially parallel to the primary access side; providing a plurality of disk drives having an elongated rectangular prismatic shape comprising two large faces and two small faces, one of the two small faces oriented parallel to the backplane; providing a back plane oriented substantially parallel to one of the at least two largest sides, the back plane having a plurality of disk drive interface connectors and at least one interface connector; the back plane with the plurality of disk drives adapted to be slidingly engaged into the interface and adapted to be removed from the enclosure through the access side as a single unit; electrically connecting the plurality of disk drives to the disk drive interface connectors of the backplane; and sliding the backplane and the plurality of disk drives into the enclosure through the access side.

The advantages of the present invention are that many more disk drives may be populated in the same volume of a rack mounted enclosure, thereby providing a much higher storage capacity than other solutions. Further, the removable backplane and disk array may be a sealed replaceable unit that is removable as a single unit.

DETAILED DESCRIPTION OF THE INVENTION

Figure 1:
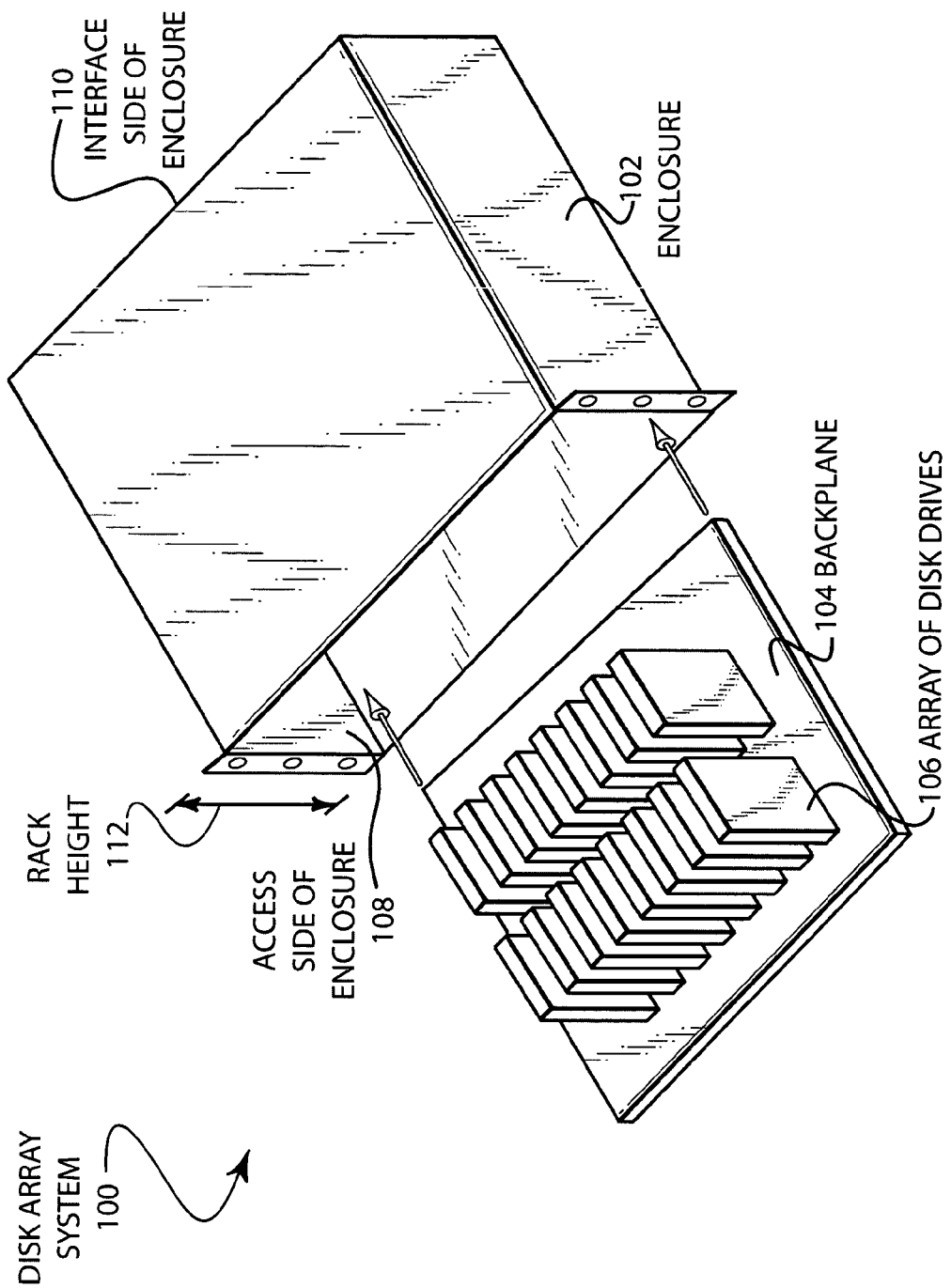
FIG. 1 is an illustration of an embodiment of the present invention showing a disk array.

FIG. 1 illustrates an embodiment 100 of the present invention showing a disk array. An enclosure 102 has a removable backplane 104 that contains an array of disk drives 106.

The embodiment 100 provides a mechanical packaging solution for a multiple disk drive storage device that allows many disk drives to be accessed through one of the smaller sides of the enclosure. Further, the embodiment 100 allows for multiple rows and columns of disk drives to fill an enclosure, which provides a much higher number of disk drives than other solutions where each disk drive must be individually accessible from the access side 108 of the enclosure.

The backplane 104 may be constructed or mounted in a way so that it may be removed through the access side 108 of the enclosure. Various sliding rails, guides, carriers, bearings, or other mechanical device may be used by those skilled in the arts to effect the general sliding motion of the backplane 104 into and out from the enclosure. In some embodiments, locking mechanisms may be used to secure the backplane 104 into the enclosure 102.

The enclosure 102 may be a rack mounted enclosure, a free standing enclosure, or other type of enclosure. In a typical installation of a data storage system, several rack mounted or free standing components are placed next to each other such that the preferred access for an enclosure is through one of the smaller faces of the enclosure. In the embodiment 100, the smaller face of the rack mounted enclosure 102 may be used for installing and removing the backplane 104 with the disk array 106. In such an embodiment, several disk arrays or other rack mounted enclosures can be placed against the large faces of the enclosure 102 while still providing access to the enclosure 102 through the access side 108.

In the embodiment 100, various power connections and interface connections may be accessed through the interface side 110 of the enclosure. Some embodiments may have all electrical connections pass through the interface side 110 while other embodiments may provide electrical connections through other sides of the enclosure, including the access side 108.

By sliding the backplane 104 out from the enclosure 102, the disk drives in the array 106 may be accessed. In some embodiments of large, multiple disk drive storage systems, the individual disk drives may be a serviceable item that may be replaced by a service technician. In such embodiments, a service technician may slide the entire backplane 104 out of the enclosure 102 in order to gain access to the disk drives 106. The technician may then remove a failed disk drive and replace the failed drive with a new drive. After performing the needed service, the technician may then insert the backplane 104 with all of the disk drives 106 into the enclosure 102 and resume normal operations.

The disk drives 106 may be inserted directly onto the backplane 104. A disk drive may have one or more electrical connectors mounted on one side of the disk drive. Such connectors may be engaged directly onto a mating connector on the backplane 104. In such embodiments, each disk drive may be mounted or supported by a secondary frame or other support in order to securely mount the disk drive to the backplane 104.

A typical disk drive being produced today has an elongated rectangular prismatic shape. The electrical connector or connectors are typically mounted perpendicular to the most elongated side and are inserted into a mating connector along the axis defined by the longest edge of the disk drive. In today's disk drives, disk drives with the designations of a 2.5 inch form factor or a 3.5 inch form factor have specific nominal sizes that are set by industry convention. Various embodiments may use data storage devices other than disk drives.

For a particular embodiment, it has been found that by using an industry standard 2.5 inch disk drive that is oriented 'soldier fashion' with the longest side of the disk drive oriented perpendicular to the backplane 104, an enclosure 102 may be constructed that is an industry standard 3 Rack Units or nominally 5.25 inches in height 112. Such an embodiment may contain 36 or more disk drives. This compares to other solutions wherein a quantity of 12 to 15, 3.5 inch disk drives are made individually replaceable through the access side 108 of the enclosure, wherein such other solutions are also 3 Rack Units or 5.25 inches in height 112.

The disk array 106 may be embodied as shown in a row and column arrangement. In other embodiments, the disk drives or other data storage devices may be arranged in clusters or groups that are assembled into the disk array 106. In still other embodiments, various mechanical placements of the data storage devices may be arranged for airflow or other mechanical or electrical reasons.

Those skilled in the arts will recognize that various sizes and quantities of disk drives may be used in various embodiments of the present invention. The embodiments discussed herein are intended only to illustrate the various features of the invention and are not meant to be limiting.

Figure 2:
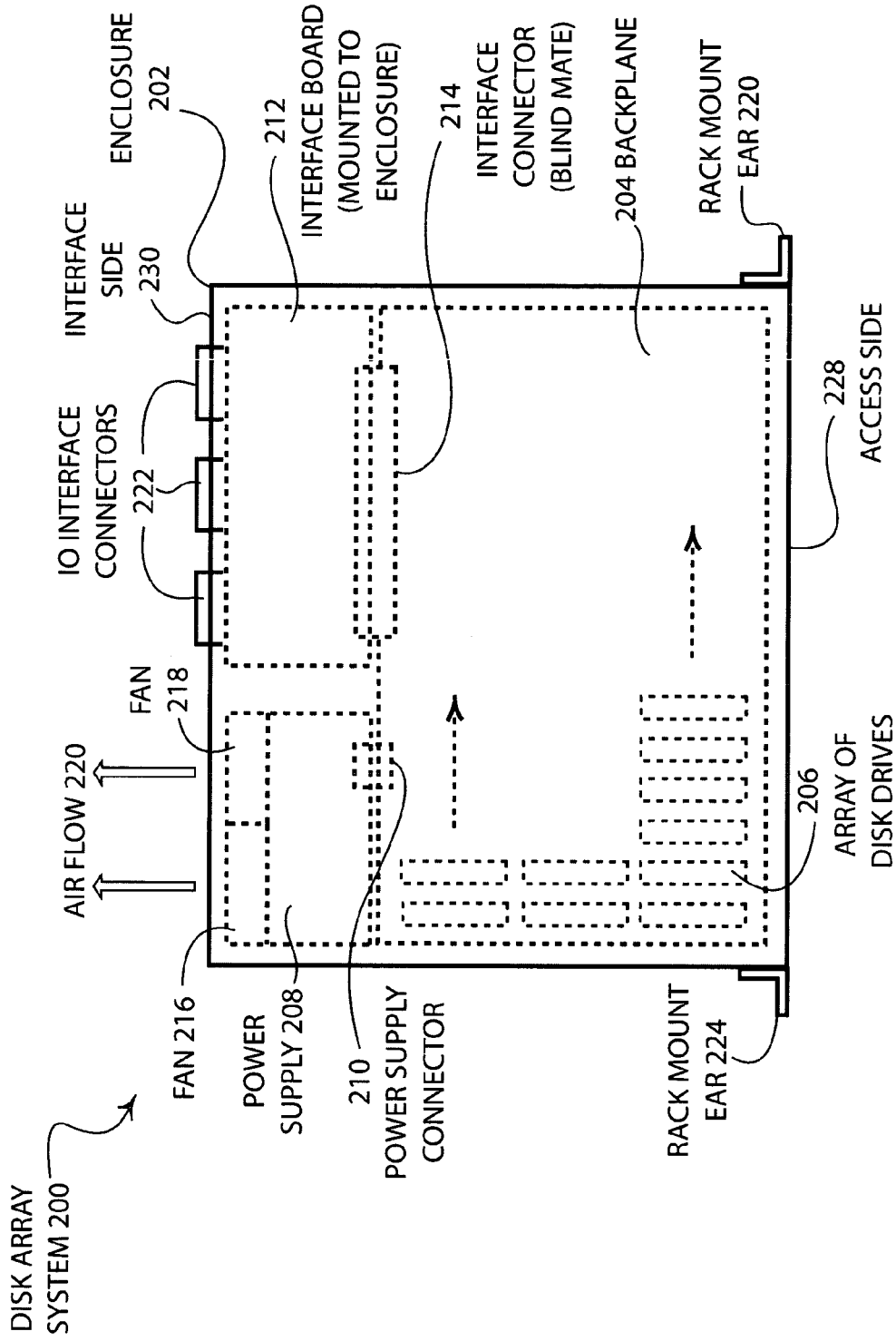
FIG. 2 is a top view illustration of another embodiment of the present invention showing a disk array.

FIG. 2 illustrates an embodiment 200 of the present invention showing a top view of a rack mounted disk array. An enclosure 202 has a backplane 204 with a disk drive array 206 mounted thereon. The backplane 204 interfaces to the power supply 208 through a power supply connector 210 and the interface board 212 through the interface connector 214. The enclosure 202 has rack mount ears 224 and 226 that enable simple mounting of the enclosure 202 to a standard sized equipment rack.

The power supply 208 may have fans 216 and 218 that produce airflow 220 through the enclosure 202. The disk drives 206 may be arranged as illustrated so as not to impede the airflow 220 through the enclosure. In such an embodiment, the access side 228 of the enclosure 202 may be perforated or otherwise facilitate airflow through the enclosure. In some embodiments, those skilled in the art will recognize that it may be advantageous to provide airflow in the opposite direction from the airflow 220. In still other embodiments, passive or active airflow may be provided through any face of the enclosure 202.

The interface board 212 may be fixed mounted into the enclosure 202. When the backplane 204 is removed and installed, the interface board 212 may stay inside the enclosure 202. In the same manner, the power supply may be fixed mounted into the enclosure 202. Both the power supply connector 210 and the interface connector 212 may be suitably chosen so that they may blindly mate with mating connectors on the backplane 204.

Any mechanical guidance mechanism such as a guide, slide rails, or other means whereby the backplane 204 may be installed and removed from the enclosure 202 may be chosen with the power supply connector 210 and interface connector 212 to provide a repeatable and reliable connection. Various blind mate connection mechanisms may be used for such applications. In some embodiments, all of the electrical connections may be consolidated into one connector while in other embodiments, three or more different connectors may be used.

The interface board 212 may have one or more input/output (I/O) interface connectors 222 accessible from the interface side 230 of the enclosure. When the enclosure 202 is attached to other devices through the I/O connectors 222, the backplane 204 may be removed from the enclosure 202 without having to disturb the cables or other connections made through the I/O connectors 222. Such an embodiment may enable service to be performed with a minimum of time and trouble.

The interface board 212 may be a simple pass through board that contains virtually no electronics or may be a full-fledged controller, such as a RAID controller, switching system, or other device.

The disk array 206 may contain a multiple number of disk drives arranged in a multiple number of rows and columns or any other type of arrangement. While a preferred embodiment may include disk drives arranged in a row and column array, other embodiments may include any type of arrangement in which a plurality of disk drives may be configured. For example, the disk drives may be arranged in a slanted pattern, circular pattern, or even a serpentine pattern. Such patterns may be selected to minimize circuit paths on the backplane, facilitate airflow within the enclosure, or for any other reason.

The enclosure 202 may be a rack mounted enclosure. In some embodiments, the enclosure 202 may be constructed to occupy one half width of a standard equipment rack. In such embodiments, two enclosures may be mounted side by side in a rack. In other embodiments, the enclosure may be benchtop enclosure, a tower enclosure, or any other type of enclosure.

Figure 3:
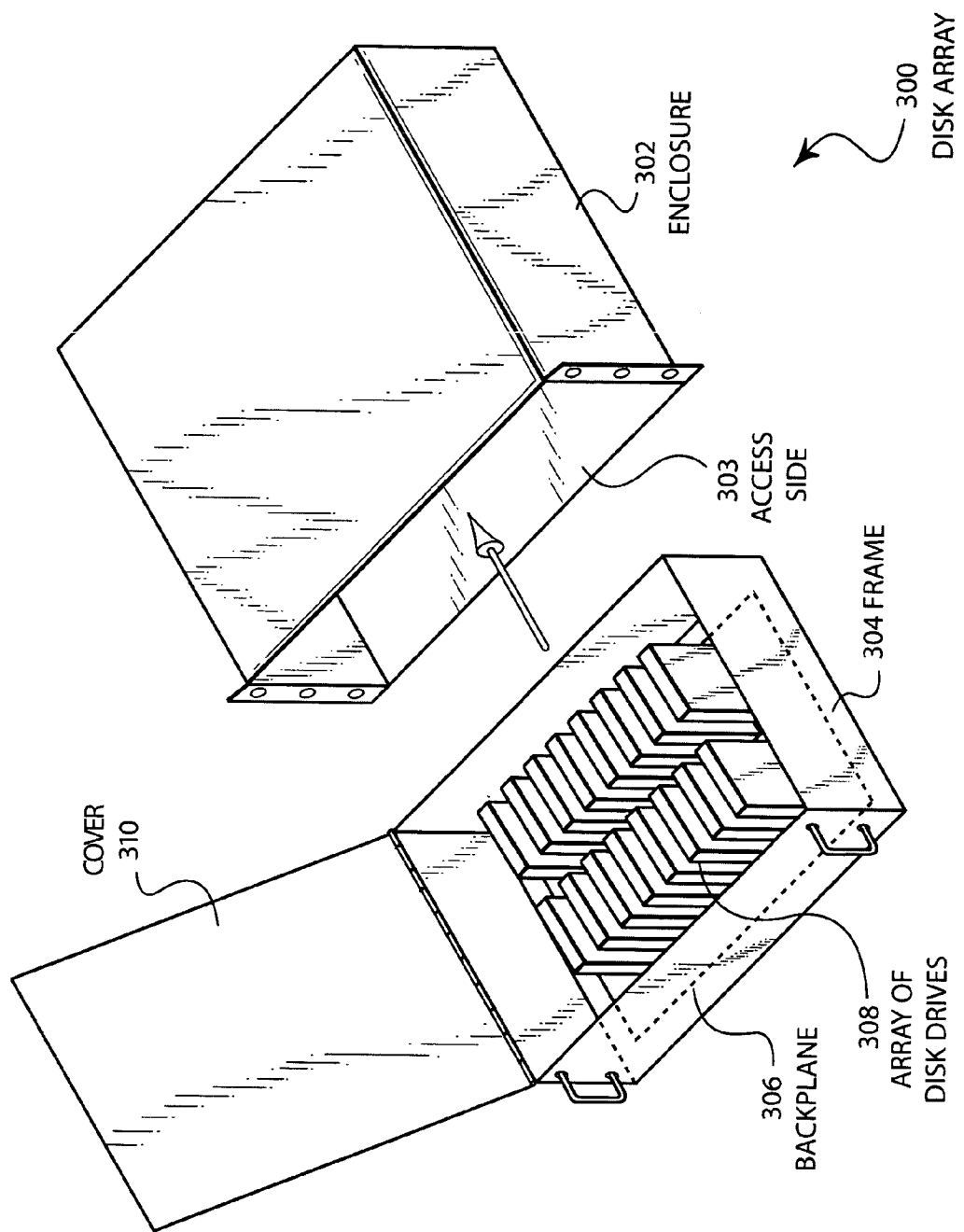
FIG. 3 is an illustration of a third embodiment of the present invention showing a disk array.

FIG. 3 illustrates an embodiment 300 of the present invention showing a disk array with a removable unit. The enclosure 302 has an access side 303 into which a frame 304 may be inserted. The frame 304 may contain a backplane 306 and an array of disk drives 308. The frame 304 may have a cover 310.

The frame 304 may be inserted into the enclosure 302 in order to electrically engage the backplane 306 into an interface board (not shown) located inside the enclosure 302. The frame 304 may allow the backplane 306 and the disk drives 308 to be handled and transported outside of the enclosure 302 without risk of damage.

The frame 304 may be adapted with guides, slides, or other mechanisms to guide the frame 304 into the enclosure. In some embodiments, the frame 304 may be mounted on slides or other devices so that the frame 304 remains connected to the enclosure 302 even when the frame 304 is drawn out of the enclosure 302. In other embodiments, the frame 304 may be a removable and replaceable component.

The frame 304 may have a cover 310 that is removeably or hingedly mounted to the frame 304. The frame 304 may be adapted to allow the cover 310 to be removed for service of the individual disk drives. In other embodiments, the frame 304 may be constructed with a cover 310 that does not enable a technician to service the individual disk drives. In such embodiments, the frame 304 and all its contents may be replaced as a single unit.

Various mounting hardware may be used to stabilize and hold the disk drives within the frame 304. For example, shock mounting bumpers, foam pads, dampeners, rigid frames, or other mounting hardware may be used to mount the disk drives 308 within the frame 304 to minimize damage to the disk drives 308.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage system with multiple disk drives comprising:
   a rectangular prismatic enclosure with six substantially planar sides having at least two largest sides and a primary access side and an input/output side, said primary access side not being one of said at least two largest sides and said input/output side being opposite of and substantially parallel to said primary access side;
   a single backplane oriented substantially parallel to said at least one of said two largest sides of said enclosure, said single backplane having a plurality of disk drive interface connectors and at least one interface connector;
   a plurality of disk drives having an elongated rectangular prismatic shape comprising two large faces and two small faces, one of said two large faces oriented perpendicularly to said single backplane, each of said disk drives electrically connected to said disk drive interface connectors of said single backplane; and
   said single backplane with said plurality of disk drives slidingly engaged into said enclosure and adapted to be removed from said enclosure through said access side as a single unit.

2. The storage system of claim 1 further comprising: an interface mechanism engaged to said interface connector and capable of transferring signals from said interface connector to at least one input/output connector accessible from said input/output side.

3. The storage system of claim 1 further comprising: at least one fan capable of causing air to flow substantially from said primary access side to said input/output side.

4. The storage system of claim 1 further comprising: at least one fan capable of causing air to flow substantially from said input/output side to primary access side.

5. The storage system of claim 1 further comprising: at least one fan capable of causing air to flow substantially from the primary access side into said enclosure.

6. The storage system of claim 1 wherein said disk drive further comprises a connector on said one of said two small faces, said connector being engaged into one of said disk drive interface connectors of said single backplane.

7. The storage system of claim 1 wherein said disk drive further comprises a mounting frame.

8. The storage system of claim 1 wherein said disk drives are 2.5 inch form factor disk drives.

9. The storage system of claim 1 wherein said disk drives, are 3.5 inch form factor disk drives.

10. The storage system of claim 1 further comprising: a frame onto which are mounted said single backplane and said plurality of drives, said frame adapted to slidingly insert into said enclosure from said access side; and wherein said single unit comprises said backplane, said plurality of disk drives, and said frame.

11. The storage system of claim 1 wherein said enclosure is a rack mountable enclosure.

12. The storage system of claim 1 wherein said enclosure is a free standing enclosure.

13. The storage system of claim 1 wherein said disk drives are oriented such that one of said small faces is substantially parallel to said single backplane.

14. A method for constructing a storage system with multiple disk drives comprising:
   providing a rectangular prismatic enclosure with six substantially planar sides having at least two largest sides, a primary access side, and an input/output side, said primary access side not being one of said at least two largest sides and said input/output side being opposite of and substantially parallel to said primary access side;
   providing a plurality of disk drives having an elongated rectangular prismatic shape comprising two large faces and two small faces, one of said two small faces oriented parallel to said single backplane;
   providing a single backplane oriented substantially parallel to one of the at least two largest sides of said enclosure, said single backplane having a plurality of disk drive interface connectors and at least one interface connector, said single backplane with said plurality of disk drives adapted to be slidingly engaged into said enclosure and adapted to be removed from said enclosure through said access side as a single unit;
   electrically connecting said plurality of disk drives to said disk drive interface connectors of said single backplane; and
   sliding said single backplane and said plurality of disk drives into said enclosure through said access side.

15. The method of claim 14 further comprising: providing an interface mechanism engagable to said interface connector and capable of transferring signals from said interface connector to at least one input/output connector accessible from said input/output side; and installing said interface mechanism into said enclosure such that said at least one input/output connector is accessible from said input/output side.

16. The method of claim 14 further comprising: providing at least one fan; and installing said at least one fan such that air is caused to flow substantially from said primary access side to said input/output side when said fan is operable.

17. The method of claim 14 further comprising: providing at least one fan; and installing said at least one fan such that air is caused to flow substantially from said input/output side to primary access side when said fan is operable.

18. The method of claim 14 further comprising: providing at least one fan; and installing said at least one fan such that air is caused to flow substantially from the primary access side into the enclosure when the fan is operable.

19. The method of claim 14 wherein said disk drive further comprises a connector on said one of said two small faces, said connector being engagable into one of said disk drive interface connectors of said single backplane.

20. The method of claim 14 wherein said disk drive further comprises a mounting frame.

21. The method of claim 14 wherein said disk drives are 2.5 inch form factor disk drives.

22. The method of claim 14 wherein said disk drives are 1 inch form factor disk drives.

23. The method of claim 14 further comprising:
   providing a frame adapted to mount said single backplane and said plurality of drives, said frame adapted to slidingly insert into said enclosure from said access side; and installing said single backplane to said frame.

24. The method of claim 14 wherein said enclosure is a rack mountable enclosure.

25. The method of claim 14 wherein said enclosure is a free standing enclosure.

26. The method of claim 14 wherein said plurality of disk drives is oriented such that one of said large faces is substantially perpendicular to said single backplane.

* * * * *